though an additional opening in the bar, this opening being positioned so that its central axis lies in the precise location for the center of the lock cylinder relative to the strike. With the bar thus positioned, the punch is struck, making a mark on the door where the lock cylinder hole can be bored. The alignment tool is then removed and the lock is installed. Pegs are provided for strikes made by different manufacturers to accommodate different size openings in the strike flanges.

United States Patent

Michaels

[11] 4,033,044
[45] July 5, 1977

[54] LOCK ALIGNMENT TOOL
[75] Inventor: Bertram Michaels, Williston Park, N.Y.
[73] Assignee: New York School of Locksmithing, Inc., Hempstead, N.Y.
[22] Filed: July 13, 1976
[21] Appl. No.: 704,849
[52] U.S. Cl. .............................. 33/189; 33/180 R
[51] Int. Cl.² ........................................ G01B 5/00
[58] Field of Search ........ 33/189, 194, 197, 180 R, 33/181 R, 174 F

[56] References Cited
UNITED STATES PATENTS

| 837,195 | 11/1906 | Chase | 33/197 |
|---|---|---|---|
| 2,384,071 | 9/1945 | Boyer | 33/189 X |

Primary Examiner—Charles E. Phillips
Attorney, Agent, or Firm—Roylance, Abrams, Berdo & Kaul

[57] ABSTRACT

An alignment tool for establishing the proper location for boring a hole in a door to receive the cylinder of a lock so that the lock will be properly aligned with the strike in a lock of the type colloquially referred to as a "jimmy-proof" lock. The strike, which has two bolt-receiving protruding flanges, is installed in the proper place on the door jamb. The alignment tool is then mounted on the strike, the tool including an elongated bar dimensioned to fit between the strike flanges and having an opening which is to be aligned with the flange openings. A peg is inserted through the flange openings and the opening in the end of the bar so that the bar is pivotable about the central axis of the flange openings. A threaded bolt penetrates the other end of the bar and the bar is moved so that the end of the bolt contacts the door surface. The bolt is then rotated until the bar is parallel with the door surface. A marking punch slidably passes through an additional opening in the bar, this opening being positioned so that its central axis lies in the precise location for the center of the lock cylinder relative to the strike. With the bar thus positioned, the punch is struck, making a mark on the door where the lock cylinder hole can be bored. The alignment tool is then removed and the lock is installed. Pegs are provided for strikes made by different manufacturers to accommodate different size openings in the strike flanges.

4 Claims, 6 Drawing Figures

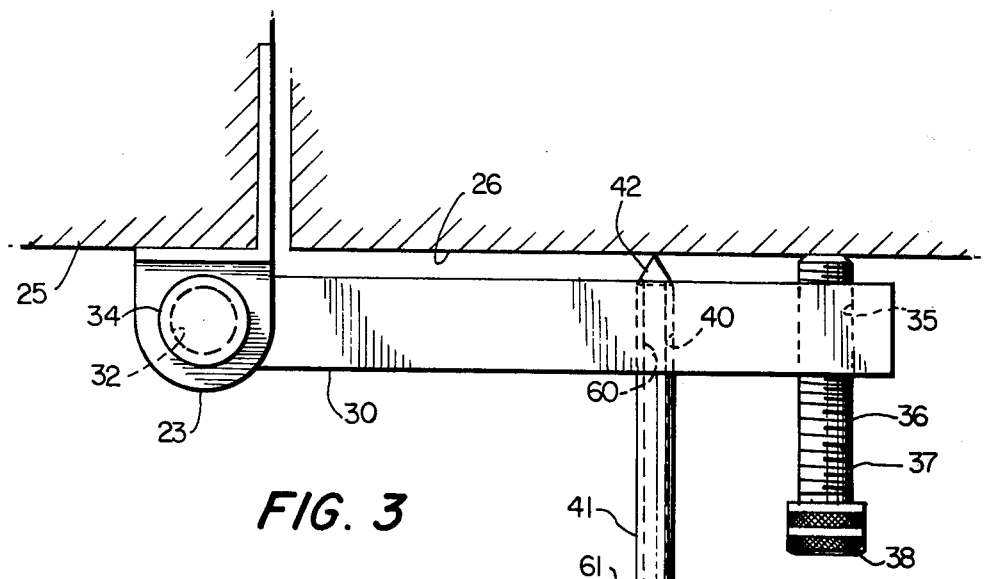
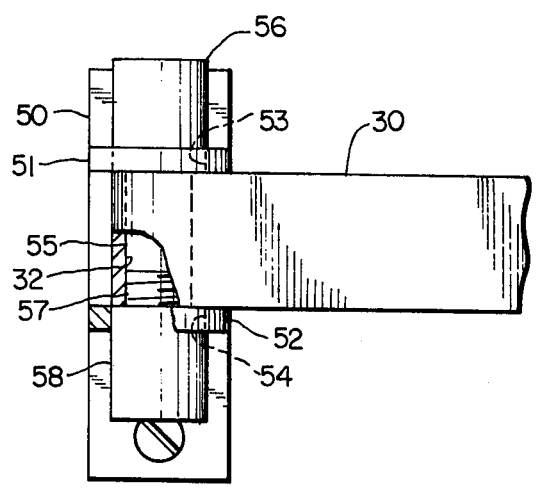
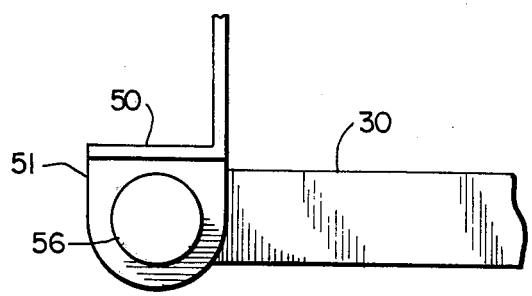

LOCK ALIGNMENT TOOL

This invention relates to a lock alignment tool to assist in the installation of "jimmy-proof" locks.

It is customary for a lock manufacturer to provide instructions on the installation of the specific lock and, usually, a template, often printed on a separate sheet or on the lock package itself, to assist the installer in locating the proper position for the components of the lock. Particular difficulty is encountered with the installation of locks of the type referred to as "jimmy-proof" locks, which in term is used herein to describe a lock having three protruding bolt housings which normally extend beyond the edge of the door or other closure on which the lock is installed, the bolt housings having therein two bolts which are extendable to positions bridging the spaces between the three housings. As installed, the bolts enter openings in two protruding flanges on the mating strike so that, when the lock is locked, the bolt housings and flanges form a nearly continuous surface with the bolt being largely concealed and unavailable for jimmying or other tampering.

It is particularly difficult to install locks of this type in exactly proper alignment using such templates and substantially impossible to do so without such templates because of the protrusion of the cylinder beyond the back of the lock. Nevertheless, it is quite important that the lock be precisely aligned because of the close interdigitation of the bolt housings with the strike flanges.

An object of the present invention is to provide a tool which permits precise alignment and location of the lock with the strike, for doors which open either in or out and regardless of the space which exists between the door and the jamb.

A further object is to provide a lock installation alignment tool, particularly for use by professional lock installers, which is simple, quick and effective to use and which is substantially foolproof.

Briefly described, the invention comprises an alignment tool for indentifying and marking the proper location on a closure for the hole to receive the cylinder of a lock of the type having a plurality of laterally extending bolt housings and a strike with a plurality of protruding flanges having openings to receive the bolts of the lock, the tool including an alignment bar substantially in the shape of a parallelepiped and dimensioned at least at one end to fit between the strike flanges, a substantially cylindrical hinge peg having a body portion and an enlarged head portion, means in said one end of the bar defining a first opening alignable with and of a size no greater than the bolt-receiving openings in the flanges for receiving the body portion of the peg, an externally threaded rod, means in said bar defining a second opening spaced from the first opening and having a central axis perpendicular to the axis of said first opening and having internal threads for receiving said rod in threaded engagement, said rod being extendable from said bar to contact the closure, rotation of the rod being effective to adjust the bar so that it becomes parallel with the closure, a punch rod having a pointed end, and means in the bar defining a third opening for receiving the punch rod, the third opening having a central axis which is parallel with the second opening, the third opening being spaced from the first opening by a predetermined distance equal to the spacing between the bolts and the cylinder of the lock, the punch rod being strikable to mark on said closure the proper point for the center of a hole to receive the lock cylinder.

In order that the manner in which the foregoing and other objects are attained in accordance with the invention can be understood in detail, particularly advantageous embodiments thereof will be described with reference to the accompanying drawings which form a part of this specification, and wherein:

FIG. 3 is a plan view, in partial section, of the arrangement of FIGS. 2;

FIG. 5 is a partial front elevation of a further embodiment of a tool in accordance with the invention; and FIG. 6 is a plan view of the apparatus of FIG. 5.

Figure 1:
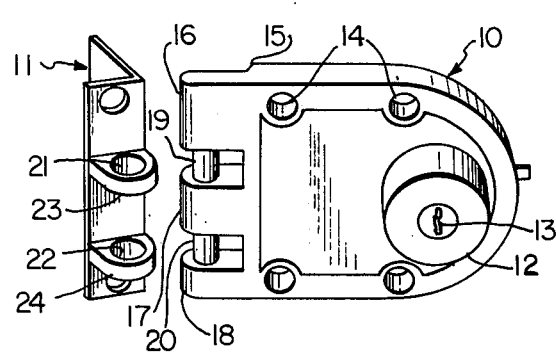
FIG. 1 is a perspective view of a typical jimmy-proof lock with which the apparatus of the invention is usable.

As shown in FIG. 1, a conventional jimmy-proof lock includes a main lock portion indicated generally at 10 and a strike indicated generally at 11. The main lock portion usually has a lock cylinder housing 12 which protrudes from the front of the lock and has a key slot 13, the lock having tumblers and the like of conventional description which will not be further discussed herein. On the opposite side of the lock, not illustrated, there is also a protruding cylinder portion for which a rather large hole must be provided in the closure so that access to the cylinder from the opposite side of the door can be had. Commonly, the cylinder is provided as a separate element with an interconnecting link extending from the back of the portion shown in FIG. 1 so that, after the hole is produced, the separate cylinder can be inserted into the hole and attached to the door using screws and a mounting plate, after which main lock portion 10 is placed on the opposite surface of the door and secured thereto by screws which pass through openings 14. In some cases the side of the lock intended to be on the inside is provided with a knob or thumb turn rather than being operated with a key, as shown. The tool disclosed herein is equally applicable to either type.

Normally, the distal edge of the closure is close to the corner 15 of the lock and bolt housings 16, 17 and 18 protrude beyond the door edge. These housings contain bolts 19 and 20 which, in the locked position of the lock, extend between the bolt housings, as shown in FIG. 1, and in the unlocked position are retracted into housings 16 and 17 by the mechanisms within the lock.

The bolts 19 and 20 are designed to pass through openings 21 and 22 in flanges 23 and 24 which protrude from the face of the strike. As seen in FIG. 1, the strike is generally L-shaped to extend partly across the face of the door jamb and in between the jamb and the door edge which may be recessed to accept the strike. Openings are provided to receive attachment screws. The invention is, of course, also usable with strikes designed for use with metal door frames or with outwardly opening doors, which strikes are simply flat and may not have the portion extending between the jamb and door edge. In such a strike flanges 23 and 24 are the same as shown.

Figure 2:
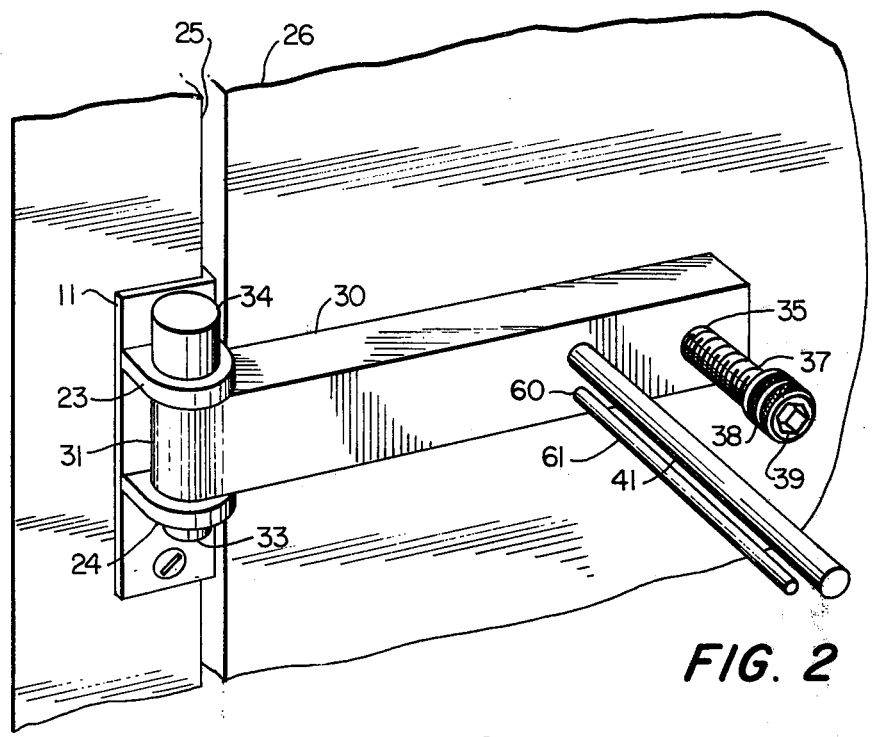
FIG. 2 is a perspective view of a lock strike, jamb and closure with the apparatus of the present invention in operative position.
Figure 4:
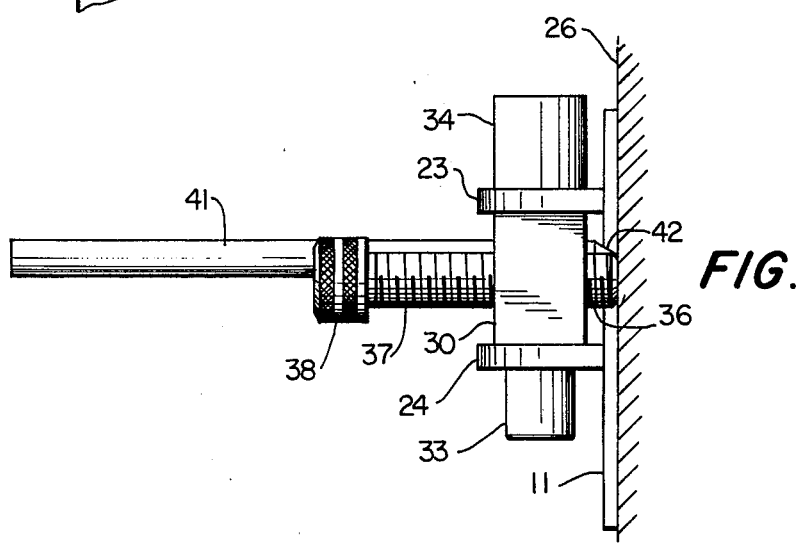
FIG. 4 is an end elevation of the arrangement of FIG. 3.

A first embodiment of an apparatus in accordance with the invention is depicted in FIGS. 2–4 wherein the frame or jamb is identified as 25 and a portion of the closure, such as a door, is illustrated at 26. Strike 11 is mounted on the jamb in its final location as a first step in installing the lock. The alignment tool is then mounted on the strike, the tool including an alignment bar 30 which, in the embodiment shown, is a metal bar in the shape of a parallelepiped having a rounded end 31 which fits between flanges 23 ad 24 of the strike. As depicted in FIGS. 2-4, the vertical dimension of the bar is chosen to be slightly less than the spacing between the flanges. While it is not necessary that the entire bar be of this dimension, at least the end portion 31 thereof must be of this dimension, and it is convenient to make the entire bar of the same height. The end 31 of bar 30 is provided with a vertically extending opening 32 which is alignable with openings 21 and 22 in the strike flanges and a hinge peg 33 is inserted through the flange openings and opening 32, peg 33 having an enlarged head portion 34 which prevents the peg from dropping entirely through the holes. Because of end 31 being rounded, bar 30, thus installed, is swingable about the central axis of peg 33 and the flange openings.

Near the other end of bar 30 is a second opening 35 which passes through the bar in a direction perpendicular to first openings 32 and which is internally threaded to receive the externally threaded end portion 36 of an adjustment bolt or rod 37 which has an enlarged knurled head 38 so that it can conveniently be grasped and manually turned. Bolt 37 can also have an hexagonal recess 39 so that it can be operated with a tool such as an Allen wrench. Clearly, a slot or hexagonal outer surface can alternatively be provided. As seen in FIGS. 3 and 4, opening 35 extends entirely through the bar, permitting the distal end of adjustment bolt 37 to protrude from that face of bar 30 which is closest to the door. Rotation of bolt 37 permits the bar to be adjusted so that it is substantially parallel with the door surface.

The bar also includes means defining a third opening 40 which extends entirely through the bar along an axis parallel with opening 35 and perpendicular to opening 32 and between openings 32 and 35. The position for opening 40 is precisely determined, relative to opening 32, so that it bears exactly the same relationship to opening 32 as does the central axis of the lock cylinder with respect to the axis of bolts 19 and 20 in the lock itself. A punch rod 41 extends through opening 40 and is provided with a pointed end 42. The pointed end of the rod thus locates, on the surface of the door, the exact position for the center of the hole to be drilled to receive the lock cylinder. Striking the outer flat end of rod 41 produces a mark on the door, after which the alignment tool can be rotated out of the way, permitting the hole to be drilled. The tool can then be removed and the lock installed.

The embodiment of the tool thus far described is suitable for use with many of the jimmy-proof locks currently available on the market such as those produced by Segal, Ilco, Dominion, Parker and others. In these locks, the openings 21 and 22 are the smallest openings used in locks of this type. For some other locks, such as those produced by Yale, the bolts themselves, and therefore the openings in the strike flanges, are larger. In order to permit use of the same basic tool of any of these types, an acccessory hinge peg can be provided as shown in FIGS. 5 and 6. In those figures, only the end of the bar which cooperates with the strike is illustrated, the remainder of the apparatus and environment being the same as shown in FIGS. 2-4. The bar 30 has the same opening 32 as previously described. The strike 50 in the type of lock using larger lock bolts has flanges 51 and 52 with aligned openings 53 and 54, these openings being of larger diameter than openings 21 and 22. For use with this strike there is provided a hinge peg 55, the body portion of which is of the same outer diameter as peg 33 so that it will pass through opening 32 in bar 30. Peg 55 is provided with an enlarged head 56 which is dimensioned to fit into opening 53, the lower extremity of head 56 abutting the upper surface of bar 30. The lower end of peg 55 is provided with an externally threaded portion 57. An annular nut 58 is provided with internal threads to engage the threaded portion 57 of the hinge peg, the outer surface of nut 58 being smooth and cylindrical and of the same outer diameter as head 56 so that it can fit through opening 54 and abutt the lower surface of bar 30. With this attachment, the bar is again mounted in close-fitting swingable relationship with the strike, whereupon bolt 37 can be adjusted to cause the bar to assume a parallel relationship with the door face, whereupon punch rod 41 can be struck to mark the centerpoint for the lock cylinder.

For purposes of rendering the tool adaptable for use with a wider variety of locks of this general type as produced by various manufacturers, a second opening 60 through bar 30 can be provided as shown in phantom lines in FIGS. 2 and 3, and opening 60 being parallel with and vertically offset from opening 40 and being smaller in diameter. A punch pin 61 of smaller diameter than punch pin 41 slidably fits in opening 60, punch pin 61 being positioned relative to opening 32 so that it marks the center of other forms of locks.

Typically, the tool is constructed so that the height of bar 30 is slightly less than 0.875 inches (2.2225 centimeters) with the diameter of peg 33 being 0.5 inches (1.27 centimeters) the inner diameter of opening 32 being slightly larger than the body to permit a sliding fit. The spacing between the centers of openings 32 and 40 is approximately 3.0625 inches (7.78 centimeters) with opening 40 being vertically offset from the centerline of bar 30 by about 0.09375 inches (0.238 centimeters). Rod 41 can be a ¼-inch rod, with a hardened point, although this dimension is by no means critical. Adjustment bolt 37 can be a ⅜-inch No. 16 cap screw. Rod 61 and opening 60 can be, for example, ⅛-inch in diameter.

While certain advantageous embodiments have been chosen to illustrate the invention, it will be understood by those skilled in the art that various changes and modifications can be made therein without departing from the scope of the invention as defined in the appended claims.

What is claimed is:
1. An alignment tool for indentifying and marking the proper location on a closure for the hole to receive the cylinder of a lock of the type having a plurality of laterally extending bolt housings and a strike with a plurality of flanges having openings to receive the bolts of the lock, the tool comprising
 an alignment bar substantially in the shape of a parallelepiped and dimensioned at least at one end to fit between said flanges;
 a substantially cylindrical hinge peg having a body portion and an enlarged head portion;
 means in said one end of said bar defining a first opening alignable with and of a size no greater than said bolt-receiving openings in said flanges for receiving said body portion of said peg;

an externally threaded rod;

means in said bar defining a second opening spaced from the first opening and having a central axis perpendicular to the axis of said first opening and having internal threads for receiving said rod in threaded engagement, said rod being extendable from said bar to contact said closure, rotation of said rod being effective to adjust said bar so that it becomes parallel with said closure;

a punch rod having a pointed end; and means in the bar defining a third opening for receiving said punch rod, said third opening having a central axis which is parallel with said second opening, said third opening being spaced from said first opening by a predetermined distance equal to the spacing between the bolts and cylinder of the lock;

said punch rod being strikable to mark on said closure the proper point for the center of a hold to receive the lock cylinder.

2. A tool according to claim 1 wherein said first opening is smaller than said openings in said flanges and said head portion of said peg is dimensioned to slidably fit through one of said flange openings but is too large to pass through said first opening;

and wherein said peg further includes an externally threaded portion at the end of said body opposite said head portion;

an internally threaded nut having a cylindrical outer surface of the same size as said head portion, said nut being insertable into said second flange.

3. A tool accordiing to claim 1 wherein said first opening is equal in diameter to said flange openings, and wherein said head portion is larger than said openings.

4. A tool according to claim 1 wherein said third opening lies between said first and second openings.

* * * * *